(12) United States Patent  
Petitpas

(10) Patent No.: US 8,783,492 B2
(45) Date of Patent: Jul. 22, 2014

(54) COVER FOR SINGLE SERVING BEVERAGE FILTER CONTAINER

(76) Inventor: Eric Petitpas, Holbrook, MA (US)

( * ) Notice: Subject to any disclaimer, the term of this patent is extended or adjusted under 35 U.S.C. 154(b) by 232 days.

(21) Appl. No.: 13/273,741

(22) Filed: Oct. 14, 2011

(65) Prior Publication Data

US 2012/0093989 A1  Apr. 19, 2012

Related U.S. Application Data

(60) Provisional application No. 61/455,015, filed on Oct. 14, 2010.

(51) Int. Cl.
*B65D 51/00* (2006.01)
(52) U.S. Cl.
USPC ........... 220/200; 220/229; 220/705; 220/906; 220/268; 220/363
(58) Field of Classification Search
USPC ........ 426/433, 76, 77, 85; 220/200, 229, 705, 220/906, 268, 266, 254.3, 363
See application file for complete search history.

(56) References Cited

U.S. PATENT DOCUMENTS

| | | | | | |
|---|---|---|---|---|---|
| 4,784,283 | A | * | 11/1988 | Cantu | 220/269 |
| 4,976,368 | A | * | 12/1990 | Klein | 220/268 |
| 5,346,087 | A | * | 9/1994 | Klein | 220/268 |
| 5,706,972 | A | * | 1/1998 | Sousa | 220/714 |
| 8,215,513 | B1 | * | 7/2012 | Grissom | 220/268 |
| 2003/0192889 | A1 | * | 10/2003 | Chasteen et al. | 220/254.3 |
| 2003/0213803 | A1 | * | 11/2003 | Chasteen et al. | 220/229 |
| 2009/0229470 | A1 | | 9/2009 | Dorfmueller | |

* cited by examiner

*Primary Examiner* — Anthony Weier
(74) *Attorney, Agent, or Firm* — Lambert & Associates; Gary E. Lambert; David J. Connaughton, Jr.

(57) ABSTRACT

A cover for single serving beverage filter containers is provided. The cover may have a body forming an aperture at its center, a door hingedly attached to the body and capable of covering the aperture, and a flange extending from an outer perimeter of the body. A spring may allow the door to be biased in a closed position to cover the aperture.

18 Claims, 1 Drawing Sheet

COVER FOR SINGLE SERVING BEVERAGE FILTER CONTAINER

BACKGROUND OF THE INVENTION

1. Field of the Invention

The present invention relates generally to electric hot beverage makers. More particularly, the present invention relates to an apparatus and method for re-using and storing single serving beverage filter containers for use in single serving hot beverage machines.

2. Description of Related Art

A single serving beverage filter container houses coffee grounds, tea leaves or other granular or powdered dry beverage medium. These containers are designed for brewing in a single serving hot beverage machine. A single serving hot beverage machine is a coffee and other hot beverage maker that brews generally one serving of the beverage at a time, and generally dispenses the beverage directly into a mug. Some single serving hot beverage machines use prefilled single serving filter containers. This type of container is comprised of an outer container that houses a filter and is prefilled with ground a beverage medium. The container has a pierceable cover that is sealed to the outer container. Further, the container has a flange extending outward from its top surface that provides a surface for attachment of the pierceable cover.

In order to brew the beverage, a user inserts the container into the machine and closes the lid. When the lid is closed, a hot water needle and outlet probe of the machine pierce the pierceable cover and container bottom, respectively. The hot water needle admits heated liquid under pressure into the container. The liquid is infused with the coffee or the like, and then passes through the filter and exits via the outlet probe for delivery into a mug. The containers are intended to be disposed of after a single use, leading to waste, inconvenience, and excess cost.

Therefore, what is needed is a device that may allow re-use of the contents of the containers, as well as re-filling and re-use of the containers themselves. What is further needed is a way to safely pre-fill, store and keep fresh the contents of the used containers for an extended period of time.

SUMMARY OF THE INVENTION

The subject matter of this application may involve, in some cases, interrelated products, alternative solutions to a particular problem, and/or a plurality of different uses of a single system or article.

In one aspect, a cover for a single serving beverage filter container is provided. The cover comprises a body having a flange extending from an outer perimeter of the body, the flange being angled inward towards a center of the body and extending past a bottom face of the body. Further, the cover comprises a door positioned at the center of the body, the door being hingedly attached to the body, and being configured to seal of an aperture formed by the body when the door is in a first closed position and providing fluid communication through the aperture when in a second open position.

In another aspect, a method of re-using and/or re-filling a single serving beverage filter container is provided. The method comprises the steps of filling the beverage filter container with a quantity of coffee grinds, attaching a removable cover to the container by mating a flange of the cover with a flange of the container, inserting the container with the cover attached into a single serving hot beverage machine, passing a hot water needle of the single serving hot beverage machine through an aperture of the cover body, forcing a door of the cover open, and removing the container with the cover attached.

DETAILED DESCRIPTION

Figure 1:
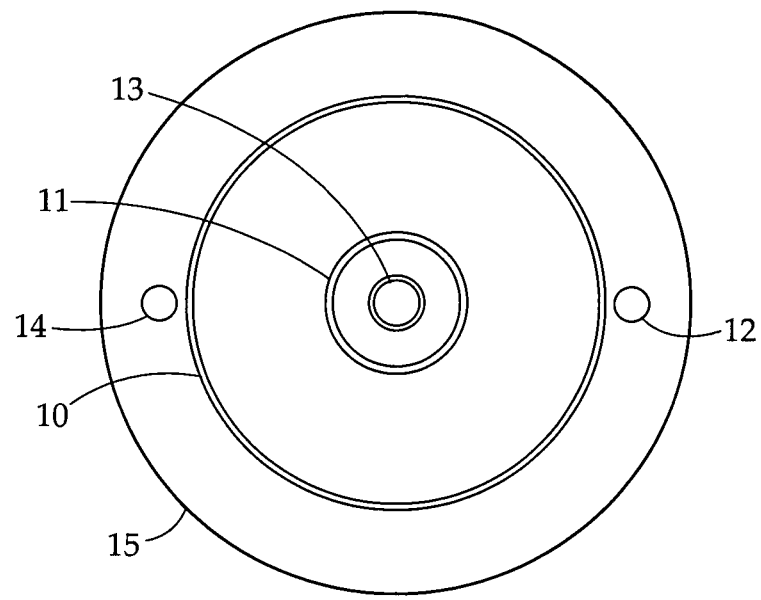
FIG. 1 provides a top view of the cover.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention concerns a cover for single serving beverage filter containers. The cover may comprise a body forming an aperture at its center. A door may be attached to the body and capable of fully covering the aperture, the body being designed and constructed for attachment to the single serving beverage filter container. A spring may allow the door to be biased in a closed position to cover the aperture. Further, the cover may comprise a substantially circular ridge that protrudes from a top face of the body, and a substantially circular indented ridge that is indented into the top face and protrudes from the bottom face of the body.

The cover contemplated herein may be used in a variety of manners. In one embodiment, the cover may be used to store used single serving beverage filter containers, allowing their contents to be re-used while maintaining freshness. In another embodiment, the cover may be used to allow re-filling and re-use of the single serving beverage filter containers. In this embodiment, a foil cover of the container may be removed and a contents of the container may be emptied, fresh coffee grounds or the like may be added, and the cover may be attached. The cover's air-tight nature keeps coffee or other beverage medium fresh, particularly if the cups are pre-filled and left for a period of time. Therefore, the cover allows the same container to be re-filled and/or re-used multiple times, thereby limiting the waste and added cost by using a new container for every beverage serving.

In one embodiment, the cover body may be generally flat. In another embodiment, a cross section of the body may form a curved indent towards its center. In a further embodiment, the door may follow the curved contour of the body at its center.

Single serving beverage filter containers contemplated herein may include, but are not limited to, containers such as K-Cups®, and similar containers designed to fit within Keurig® coffee makers and their equivalent single serving coffee, tea, or hot-chocolate makers. Moreover, single serving hot beverage machines contemplated herein may include but are not limited to Keurig® single serving coffee machines, and other similar machines that employ single serving hot beverage technologies.

In one embodiment, the cover may have a flange that extends from its outer perimeter downward and at an angle towards the center of the cover. In this embodiment, the flange is constructed to be mated with a flange protruding outward from a single serving beverage filter container. The mating of the cover and the container may be performed by snap fit, such that upon application of a downward force, the cover deforms the flange of the container slightly. Upon deformation, that the flange bends and then releases once the cover flange has passed it. Upon release, the flange of the container fits within the cavity formed by the cover body and cover flange.

Turning now to FIG. 1, a top view of the cover is shown. The body 15 provides the structure for the cover and the elements thereon. The body 15 has a perimeter that is substantially circular. Further, the body 15 is constructed from a substantially rigid material configured to be mounted to the single serving beverage filter container (not shown). In one embodiment, the body may be constructed of a stainless steel panel that may be 0.3 millimeters in thickness. An indented ridge 10 is depressed in a circle around the body 15. The indented ridge 10 is concentric with the outer perimeter of the body 15. This indented ridge 10 may protrude from the bottom face of the cover (not shown). In one embodiment, the indented ridge 10 may increase the rigidity of the cover body 15.

A protruding ridge 11 extends from the surface of the body 15. The protruding ridge 11 is concentric with the outer perimeter of the body 15 and has a radius substantially less than the radius of the indented ridge 10. In one embodiment, the protruding ridge may create a seal between the cover and a rubber sealer in a single serving hot beverage machine (not shown). In this embodiment, by forming a seal, the protruding ridge 11 may prevent spillage.

A first bolt 12 is shown passing through the cover. In one embodiment the first bolt 12 can secure the spring (not shown) to the body 15. A spring loaded door 13 is positioned at the center of the body 15. The spring loaded door 13 is hingedly attached to the body 15 and biased in a closed positioned by a spring (not shown). To open the door will swing downward, away the bottom face of the body. In one embodiment the spring may be a flexible metal strip with a high elastic modulus (see FIG. 2). The spring loaded door 13 covers an aperture of the body 15 when in a closed first position, and allows fluid communication through the aperture when in an open second position. A second bolt 14 passes through the cover opposite to the first bolt 12.

Figure 2:
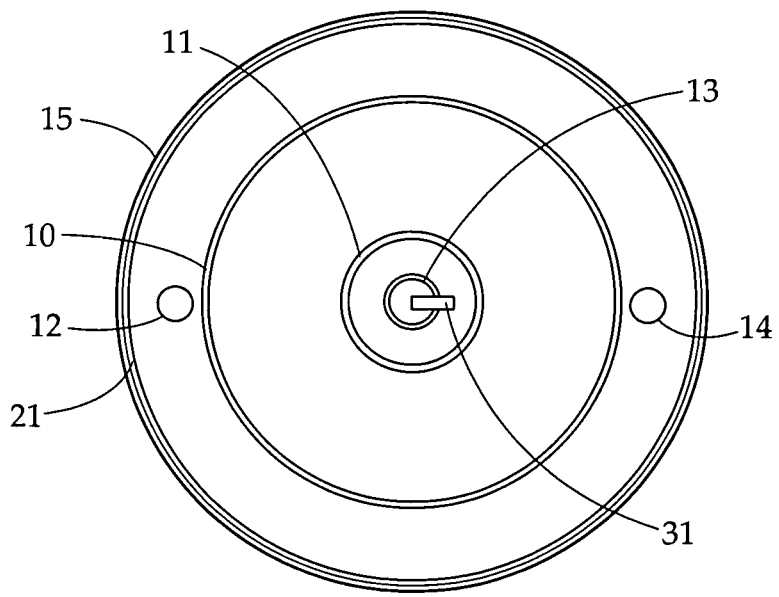
FIG. 2 provides a bottom view of the cover.

FIG. 2 shows a bottom view of the cover. A protruding ridge 10 extends in a circle around the body 15. This protruding ridge 10 of the bottom is the same element as the indented ridge 10 of the top, in that the indent of the top of the body yields a protrusion in the bottom. The protruding ridge 10 is concentric with the outer perimeter of the body 15. A first bolt 12 extends through the body 15. An indented ridge 11 extends from the surface of the body 15. The indented ridge 11 is the same as the protruding ridge of the top shown in FIG. 1. The indented ridge 11 is concentric with the outer perimeter of the body 15 and has a radius substantially less than the radius of the protruding ridge 10. A spring loaded door 13 is positioned at the center of the body 15. The spring loaded door 13 is hingedly attached to the body by spring 31, shown here as a flexible metal strip with a high elastic modulus. However, in other embodiments, the spring may be, for example, an elastic or a coiled metal spring. In these embodiments, a separate hinge may be employed along with the spring. The spring loaded door 13 covers an aperture of the body 15 when in a closed first position, and allows fluid communication through the aperture when in an open second position. A second bolt 14 passes through the cover opposite to the first bolt 12. A flange 21 for attachment to the single serving beverage filter containers extends from the perimeter of the body 15.

Figure 3:
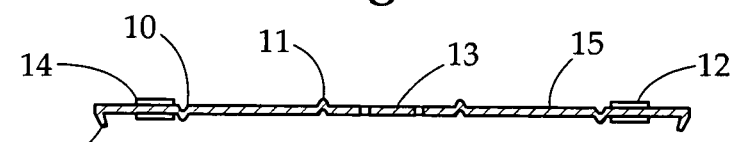
FIG. 3 provides a side cutaway view of the cover.

FIG. 3 provides a side cutaway view of the cover. The flange 21 is shown on each side of the body 15. The flange 21 extends past the bottom face of the body 15 and angles in slightly toward the center of the body 15. The indented ridge 10 of the top can be seen to be protruding from the top, and indented in the top and protruding from the bottom. Similarly, the protruding ridge 11 can be seen to be indented in the bottom of the body. The door 13 fits flush with the aperture formed by the body 15. First and second bolts 12, 14 are shown protruding from the top of the body 15.

Methods of use of the cover are additionally contemplated herein. In one embodiment a method of re-using and/or re-filling a single serving beverage filter container is provided. The method comprises the steps of filling the beverage filter container with a quantity of beverage medium such as coffee grinds, attaching a removable cover to the container by mating a flange of the cover with a flange of the container, inserting the container with the cover attached into a single serving hot beverage machine, passing a hot water needle of the single serving hot beverage machine through an aperture of the cover body and forcing a door of the cover open, and removing the container with the cover attached. In a further embodiment, the method may include the step of pre-filing the single serving beverage filter container with a quantity of coffee grinds (or other hot beverage base), and re-filling the container after brewing the hot beverage.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A cover for a single serving beverage filter container comprising:
    a body having a flange extending from an outer perimeter of the body, the flange being angled inward towards a center of the body and extending past a bottom face of the body;
    a door positioned at the center of the body and attached to the body, the door forming a seal of an aperture formed by the body when the door is in a first position and providing fluid communication through the aperture when in a second position; and
    wherein the door is spring loaded by a spring, the spring biased to hold the door in the first position, the door and spring configured to provide repeated movement of the door between the first position and the second position.

2. The cover for a single serving beverage filter container of claim 1 wherein the flange is constructed and arranged to be mated with a flange protruding from the single serving beverage filter container.

3. The cover for a single serving beverage filter container of claim 2 wherein the body is substantially circular.

4. The cover for a single serving beverage filter container of claim 3 further comprising a substantially circular indented ridge, the ridge indented into a top face of the body and having a perimeter that is concentric with the outer perimeter of the body.

5. The cover for a single serving beverage filter container of claim 4 wherein the indented ridge in the top face forms a protrusion on the bottom face of the body.

6. The cover for a single serving beverage filter container of claim 3 further comprising a substantially circular protruding ridge extending from a top face of the body, the substantially circular ridge having a perimeter that is concentric with the outer perimeter of the body.

7. The cover for a single serving beverage filter container of claim 6 wherein the ridge is constructed and arranged to form an airtight seal with a rubber seal of a single serving hot beverage machine.

8. The cover for a single serving beverage filter container of claim 1 wherein the spring is a flexible metal strip forming the hinged attachment of the door to the body.

9. The cover for a single serving beverage filter container of claim 1 wherein the spring is a coiled spring attached to the bottom face of the body at a first end and to the door at a second end.

10. The cover for a single serving beverage filter container of claim 1 further comprising a bolt, the bolt passing through the top and bottom faces of the body, a first end of the spring attached to the bolt, and a second end of the spring being attached to the door.

11. The cover for a single serving beverage filter container of claim 1 wherein the cover is removably attached to the single serving beverage filter container.

12. The cover for a single serving beverage filter container of claim 11 wherein the cover is constructed and arranged to be snap fit onto the flange of the single serving beverage filter container.

13. The cover for a single serving beverage filter container of claim 1 wherein the body is constructed of a substantially rigid material, the substantially rigid material constructed and arranged to be mounted to the single serving beverage filter container.

14. The cover for a single serving beverage filter container of claim 13 wherein the body is constructed of a 0.3 mm thick stainless steel panel.

15. The cover for a single serving beverage filter container of claim 1 wherein the door is hinged to swing toward and past the bottom face of the body.

16. The cover for a single serving beverage filter container of claim 1 wherein aperture of the body covered by the door is sized to received a water needle of a single serving hot beverage machine.

17. A removable cover for a single serving beverage filter container comprising:
   a, circular body;
   a spring loaded door positioned at a center of the body, and hingedly attached to the body, the hinged attachment allowing the door to swing into an opened second position by swinging away from a bottom face of the body, the door forming a seal of an aperture formed by the body when the door is in a first position and providing fluid communication through the aperture when in a second position;
   the body further comprising a flange extending from an outer perimeter of the body, the flange being angled inward towards the center of the body and extending past a bottom face of the body, the flange of the body constructed and arranged to mate with a flange protruding from the single serving beverage filter container; and
   a substantially circular protruding ridge extending from a top face of the body, the substantially circular ridge having a perimeter concentric with the outer perimeter of the body, the protruding ridge constructed and arranged to form a seal with a rubber seal of a single serving hot beverage machine.

18. A removable cover for a single serving beverage filter container comprising:
   a body having a flange extending from an outer perimeter of the body, the flange being angled inward towards a center of the body and extending past a bottom face of the body;
   a door positioned at the center of the body and attached to the body, the door forming a seal of an aperture formed by the body when the door is in a first position and providing fluid communication through the aperture when in a second position; and
   wherein the cover is removably attachable to the single serving beverage filter container.

* * * * *